US012634256B2

(12) United States Patent
Oxman et al.

(10) Patent No.: US 12,634,256 B2
(45) Date of Patent: May 19, 2026

(54) PROXY-LESS PRIVATE CONNECTIVITY ACROSS VPC NETWORKS WITH OVERLAPPING ADDRESSES

(71) Applicant: Google LLC, Mountain View, CA (US)

(72) Inventors: Eli Oxman, Tel Aviv (IL); Salomon Sonny Ben-Shimon, Tel-Aviv (IL); Anshuman Gupta, Sunnyvale, CA (US); Alok Kumar, Fremont, CA (US); Ittai Balaban, Mishmarot (IL); Benjamin John Benardos, Sunnyvale, CA (US); Sameer Adhikari, San Jose, CA (US); Mukta Gupta, Santa Clara, CA (US); Anjin Guo, San Jose, CA (US); Pierre-Emmanuel Ettori, Redwood City, CA (US); Noam Lampert, Modiin (IL); Uday Ramakrishna Naik, Pleasanton, CA (US); Jesse Louis Alpert, Even Yehuda (IL); Ines Clara Envid Lazaro, Palo Alto, CA (US); Uri Goren, Rishon LeZion (IL); Ariel Waizel, Nes Ziona (IL)

(73) Assignee: Google LLC, Mountain View, CA (US)

( * ) Notice: Subject to any disclaimer, the term of this patent is extended or adjusted under 35 U.S.C. 154(b) by 51 days.

(21) Appl. No.: 17/970,073

(22) Filed: Oct. 20, 2022

(65) Prior Publication Data

US 2023/0123734 A1 Apr. 20, 2023

Related U.S. Application Data

(60) Provisional application No. 63/257,843, filed on Oct. 20, 2021.

(51) Int. Cl.
*H04L 61/256* (2022.01)
*H04L 12/46* (2006.01)

(52) U.S. Cl.
CPC ........ *H04L 61/256* (2013.01); *H04L 12/4641* (2013.01)

(58) Field of Classification Search
CPC .......................... H04L 61/256; H04L 12/4641
See application file for complete search history.

(56) References Cited

U.S. PATENT DOCUMENTS 8,683,023 B1 * 3/2014 Brandwine ......... H04L 12/4641
709/222
9,021,102 B2 * 4/2015 Pasternak ............... H04L 67/02
709/227

(Continued)

OTHER PUBLICATIONS

"AWS PrivateLink", [Retrieved Oct. 13, 2022], Retrieved from internet: <https://aws.amazon.com/privatelink/?privatelink-blogs.sort-by=item.additionalFields.createdDate&privatelink-blogs.sort-order=desc>, 12 pages.

*Primary Examiner* — Madhu Woolcock
(74) *Attorney, Agent, or Firm* — Lerner David LLP

(57) ABSTRACT

Establishing proxy-less connectivity from logically isolated virtual private clouds (VPC)within a cloud environment without the use of VPN or VPC peering is provided. Establishing a service attachment in one VPC, related to a service which is to be accessed, and a service endpoint in another VPC allows for private communication between the two networks without exposing the service to other VPCs in the cloud environment.

15 Claims, 9 Drawing Sheets

(56)　　　　　　　References Cited

U.S. PATENT DOCUMENTS

| | | | |
|---|---|---|---|
| 9,106,482 | B1 | 8/2015 | Bapat et al. |
| 9,164,795 | B1 * | 10/2015 | Vincent ............... H04L 12/4633 |
| 9,614,748 | B1 * | 4/2017 | Battersby ............. G06F 9/5061 |
| 9,769,149 | B1 * | 9/2017 | Brady ................ H04L 63/0823 |
| 9,832,118 | B1 * | 11/2017 | Miller .................... H04L 45/74 |
| 10,021,196 | B1 * | 7/2018 | Akers .................... H04L 67/10 |
| 10,057,267 | B1 * | 8/2018 | Miller .................. H04L 63/102 |
| 10,212,161 | B1 * | 2/2019 | Schaefer .............. H04W 12/08 |
| 11,159,344 | B1 * | 10/2021 | Shevade .............. H04L 45/033 |
| 2002/0116502 | A1 * | 8/2002 | Iyer ......................... H04L 61/00 |
| | | | 709/227 |
| 2004/0194106 | A1 * | 9/2004 | Ogawa ................ H04L 61/4511 |
| | | | 718/100 |
| 2006/0209831 | A1 * | 9/2006 | Shepherd ............ H04L 12/4641 |
| | | | 370/392 |
| 2011/0320821 | A1 * | 12/2011 | Alkhatib ............. H04L 61/2546 |
| | | | 709/228 |
| 2014/0059205 | A1 * | 2/2014 | Mohammed .......... H04L 69/163 |
| | | | 709/224 |
| 2014/0258496 | A1 * | 9/2014 | Wu ..................... H04L 67/1001 |
| | | | 709/223 |
| 2015/0134853 | A1 * | 5/2015 | Verwoerd ........... H04L 61/2514 |
| | | | 709/245 |
| 2015/0319179 | A1 * | 11/2015 | Miasojed ............ H04L 63/0281 |
| | | | 726/1 |
| 2016/0226815 | A1 * | 8/2016 | Wan .................... H04L 61/2521 |
| 2017/0223154 | A1 * | 8/2017 | Hammam ............... H04L 45/60 |
| 2018/0115624 | A1 * | 4/2018 | Poumeyrol ........... H04L 67/563 |
| 2019/0007366 | A1 * | 1/2019 | Voegele ............. H04L 61/4511 |
| 2019/0273681 | A1 * | 9/2019 | Williams ............ H04L 61/2517 |
| 2019/0281014 | A1 * | 9/2019 | Lin ..................... G06F 11/2023 |
| 2020/0092138 | A1 * | 3/2020 | Tillotson ............. H04L 12/4633 |
| 2020/0274779 | A1 * | 8/2020 | Rolando ............. H04L 41/5003 |
| 2022/0045985 | A1 * | 2/2022 | Bareket .................. H04L 45/04 |
| 2022/0123934 | A1 * | 4/2022 | Chen .................... H04L 9/0819 |

* cited by examiner

100

Computing System 110

115

Network Device 124

Network Interface Controller 120

Network Interface Card 122

Processor 105

Cache 175

I/O 130

Memory 170

Other 180

PROXY-LESS PRIVATE CONNECTIVITY ACROSS VPC NETWORKS WITH OVERLAPPING ADDRESSES

CROSS-REFERENCE TO RELATED APPLICATIONS

The present application claims the benefit of the filing date of U.S. Provisional Patent Application No. 63/257,843 filed Oct. 20, 2021, the disclosure of which is hereby incorporated herein by reference.

BACKGROUND

A virtual private cloud (VPC) network can be conceptualized as a physical network which is virtualized within a cloud environment. The VPC network can consist of a VPC routing mechanism which connects to the external internet, and in turn routes traffic to various virtual machines or other endpoints within the VPC network. VPC networks can also be completely isolated from the external internet. The VPC network can be divided by groups, such as by a subnet, and each endpoint can further have an address related to the address of the subnet in which it exists.

Private connectivity between two VPC networks could be achieved using (i) VPC network peering and (ii) virtual private network (VPN) connections. In VPC network peering, VPC networks within one cloud environment could be connected internally, without traffic leaving the cloud environment and traversing public internet. VPC Peering and VPNs provide bidirectional access which can be less secure for certain service providers/consumers.

When using VPN connections, non-overlapping internet protocol (IP) ranges are required across the consuming compute endpoints, such as virtual machine (VM) instances, and serving compute endpoints, such as load balancers or backends. In the case of VPC peering, as full mesh connectivity between the two peered VPC networks is achieved, subnet ranges have to be non-overlapping, not only between the two networks that were peering, but also between any other networks peered with the peered network. Additionally, the overall size of the combined network becomes very large as the number of peering connections increases. Non-overlapping subnet or other address ranges for each subnet or network connecting would be required for VPC peering.

These solutions to VPC cross-network private connectivity require management of specific IP addresses or subnet ranges, and do not allow for scalability.

SUMMARY

Aspects of the disclosed technology include a method of communicating between networks on a cloud service. The method can comprise any of determining data to be consumed by a consumer network on the cloud service, the data stored on a producer network, the consumer network comprising a consumer address space including a plurality of existing consumer addresses, the producer network comprising a producer address space including a plurality of existing producer addresses; generating, by the consumer network, a first address in a consumer address space; generating, by the producer network, a second address in a producer address space; establishing, using the first address and the second address, a data path between one of the plurality of existing consumer addresses of the consumer network and one of the existing producer addresses of the producer network; translating, using network address translation, the first address in the consumer address space to the one of the plurality of existing producer addresses the producer address space; and sending data from the producer network to the consumer network via the data path. Establishing the data path can include sending a request message from the consumer network and an accept message from the producer network. A level 7 internal load balancer or level 7 OSI model can be used to communicate between the networks of the cloud service. A level 4 internal load balancer or level 4 OSI model protocol is used to communicate between the networks of the cloud service. The consumer network and producer network can be running on a distributed computing platform. A service to be accessed in the producer network can be a container. One or more of the plurality of existing consumer addresses can be the same as one or more of the plurality of existing producer addresses. A service to be accessed in the producer network can be an internal load balancer. The method of claim 1 wherein a service to be accessed in the producer network is a network endpoint group. The sending of the data from the producer network to the consumer network can occur between a virtual machine on the producer network and a virtual machine on the consumer network. A portion of the network address translation can be done on a software-defined networking layer. A portion of the network address translation can be done on one or more physical hosts associated with the consumer network or the producer network. Establishing the data path can comprise sending a request message from the consumer network and an accept message from the producer network. Translating the one of the plurality of existing producer addresses in the producer address space to the first address in the consumer address space can occur using network address translation.

Aspects of the disclosed technology can include a system, the system comprising any combination of the following features. The system may comprise one or more processing devices coupled to a memory containing instructions, the instructions causing the one or more processing devices to: determine data to be consumed by a consumer network on the cloud service, the data stored on a producer network; generate, by the consumer network, an address in a consumer address space; generate, by the producer network, an address in a producer address space; translate, using network address translation, from the consumer address space to the producer address space; establish a data path between the consumer network and the producer network; and send data from the producer network to the consumer network via the data path. Establishing the data path can comprise sending a request message from the consumer network and an accept message from the producer network. The consumer network and producer network can be running on a distributed computing platform. A service to be accessed in the producer network can be a container. Sending of the data from the producer network to the consumer network can occurs between a virtual machine on the producer network and a virtual machine on the consumer network. A portion of the network address translation can be done on a software-defined networking layer.

Aspects of the disclosed technology can include a non-transitory computer readable medium containing instructions, the instructions when executed configured to perform the steps of determining data to be consumed by a consumer network on the cloud service, the data stored on a producer network; generating, by the consumer network, an address in a consumer address space; generating, by the producer network, an address in a producer address space; translating, using network address translation, from the consumer address space to the producer address space; establishing a data path between the consumer network and the producer network; and sending data from the producer network to the consumer network via the data path.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Overview

Figure 1:
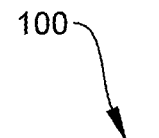
FIG. 1 illustrates an example computing system according to aspects of the disclosure.

The disclosed technology can be used to connect networks belonging to different users or owners, without the use of virtual private networks or VPC peering. The networks can be VPC networks which can all be running on a platform provided by a single cloud computing provider. Certain networks can be deemed "producer" networks while others may be deemed "consumer" networks depending on the network producing, providing, consuming, or requesting a service.

Through the use of the technology disclosed, services can be connected from a producer's network to multiple consumers' networks without using public IPs. Each service to be accessed in a producer's network can be setup or configured in a consumer's network once. Once the setup or configuration is completed, depending on the nature of the service, data can be directly routed to the service or be "network address translated" and then sent to the service.

In broad overview, the technology enables the establishment of private connections on the producer network and consumer network. A service attachment, which is related to a service, can be created on a producer's network. The service attachment points to the service created and provides a network address translation (NAT) classless inter-domain routing (CIDR) range. The range is allocated from the producer's network and used by the consumer's network to NAT source addresses to communicate with the service, when needed. On the consumer network side, a service endpoint can be created on the consumer's network that connects to the producer's service attachment. The consumer's service endpoint contains a service private virtual internet protocol (VIP) address allocated from the consumer's network. Endpoints in the consumer network can use this address to send traffic to the service producer. The service endpoints can request the establishment of the private connection, and the service attachment can accept the request to complete the establishment of the private connection. Upon completion of the connection, packets of data can generally be transmitted across the consumer network and the producer network, or between the service on the producer network and the requesting node or resource on the consumer network. The service attachments and endpoints may be logical concepts, and not a proxy, thereby providing a proxy-less solution.

As will be appreciated from the description below, the disclosed technology removes the requirement that an IP in one VPC network not overlap with an IP in another VPC network when connecting between VPC networks on the same cloud. Further, it allows for a service in a VPC network to be exposed or accessed by an arbitrary number of other VPC networks, and vice versa. As will be appreciated from the disclosure below, the availability of or establishment of private connections between VPC networks can be scaled to a high number of networks. Additionally, due to this being a proxy-less solution, these connections ensure a zero regression in network latency and throughput, compared to intra-VPC virtual machine-to-virtual machine networking.

Example Systems and Methods

FIG. 1 is a block diagram 100 illustrating an example computer system 110 with which aspects of this disclosure, including the techniques described herein, and any components thereof, can be implemented. In certain aspects, the computer system 110 may be implemented using hardware or a combination of software and hardware, either in a dedicated server, or integrated into another entity, or distributed across multiple entities.

In some examples, example computing system 110 can be a user computing system or device. In other examples, a virtual private cloud, as for example shown in FIG. 2, can consist of one or more example computer systems, similar to computing system 110, coupled or linked via software and hardware components to operate collectively as a cloud or platform hosting multiple virtual private clouds. In some examples, software such as hypervisors, virtual machine monitors, container orchestration systems, such as Kubernetes, Docker, OpenShift, or other software for cloud deployment, scaling, and management can be used on one or more example computer systems to form a virtual private network or a platform to provide, host, and run virtual private networks.

In broad overview, the computing system 110 includes at least one processor 150 for performing actions in accordance with instructions and one or more memory devices 170 or 175 for storing instructions and data. The illustrated example computing system 110 includes one or more processors 150 in communication, via a bus 115, with at least one network interface driver controller 120 with one or more network interface cards 122 connecting to one or more network devices 124, memory 170, and any other devices 180, e.g., an I/O interface. The network interface card 122 may have one or more network interface driver ports to communicate with the connected devices or components. Generally, a processor 150 executes instructions received from memory. The processor 150 incorporates, or is communicatively coupled to, cache memory 175.

In more detail, the processor 150 may be any logic circuitry that processes instructions, e.g., instructions fetched from the memory 170 or cache 175. In many embodiments, the processor 150 is a microprocessor unit or special purpose processor. The computing device 110 may be based on any processor, or set of processors, capable of operating as described herein. The processor 150 may be a single core or multi-core processor. The processor 150 may be multiple processors. In some implementations, the processor 150 can be configured to run multi-threaded operations. In some implementations, the processor 150 may host one or more virtual machines or containers, along with a hypervisor or container manager for managing the operation of the virtual machines or containers. In such implementations, the methods shown and described in the figures below can be implemented within the virtualized or containerized environments provided on the processor 150.

The memory 170 may be any device suitable for storing computer readable data. The memory 170 may be a device with fixed storage or a device for reading removable storage media. Examples include all forms of non-volatile memory, media and memory devices, semiconductor memory devices, such as EPROM, EEPROM, SDRAM, and flash memory devices, magnetic disks, magneto optical disks, and optical discs, such as CD ROM, DVD-ROM, and Blu-ray® discs. A computing system 110 may have any number of memory devices 170. In some implementations, the memory 170 supports virtualized or containerized memory accessible by virtual machine or container execution environments provided by the computing system 110.

The cache memory 175 is generally a form of computer memory placed in close proximity to the processor 150 for fast read times. In some implementations, the cache memory 175 is part of, or on the same chip as, the processor 150. In some implementations, there are multiple levels of cache 175, e.g., L2 and L3 cache layers.

The network interface driver controller 120 manages data exchanges via the network interface driver 122 (also referred to as network interface driver ports). The network interface driver controller 120 handles the physical and data link layers of the Open Systems Interconnection Model (OSI) model for network communication. In some implementations, some of the network interface driver controller's tasks are handled by the processor 150. In some implementations, the network interface driver controller 120 is part of the processor 150. In some implementations, a computing system 110 has multiple network interface driver controllers 120. The network interface driver ports configured in the network interface card 122 are connection points for physical network links. In some implementations, the network interface controller 120 supports wireless network connections and an interface port associated with the network interface card 122 is a wireless receiver/transmitter. Generally, a computing device 110 exchanges data with other network devices 124 via physical or wireless links that interface with network interface driver ports configured in the network interface card 122. In some implementations, the network interface controller 120 implements a network protocol such as Ethernet. In some examples, the network interface driver controller 120 is used for conversion of certain virtual IP addresses to "real" or physical IP addresses, and vice versa, to enable connectivity between networks described herein.

The other network devices 124 may be connected to the computing device 110 via a network interface driver port included in the network interface card 122. The other network devices 124 may be peer computing devices, network devices, or any other computing device with network functionality. For example, a first network device 124 may be a network device such as a hub, a bridge, a switch, or a router, connecting the computing device 110 to a data network such as the internet.

The other devices 180 may include an I/O interface, external serial device ports, and any additional co-processors. For example, a computing system 110 may include an interface (e.g., a universal serial bus (USB) interface) for connecting input devices (e.g., a keyboard, microphone, mouse, or other pointing device), output devices (e.g., video display, speaker, or printer), or additional memory devices (e.g., portable flash drive or external media drive). In some implementations, a computing device 100 includes an additional device 180 such as a coprocessor, e.g., a math co-processor can assist the processor 150 with high precision or complex calculations.

Instructions on computing system 110 may control various components and functions of computing system 110. For example, the instructions may be executed to perform any of the methods indicated in this disclosure. In some examples, algorithms can be included as a subset of or otherwise as part of instructions included on computing system 110. Instructions can include algorithms to execute any of the methods or a subset of the methods described within this disclosure. Additionally, instructions can include algorithms or commands to translate between physical and virtual IP addresses, User interfaces on the computing system 110 may include a screen which allows a user to interact with computing system 110, such as a touch screen or buttons. A display can also be included such as an LCD, LED, mobile phone display, electronic ink, or other display to display information about computing system 110. The user interface can allow for both input from a user and output to a user. A communication interface(s) can include hardware and software to enable communication of data over standards such as Wi-Fi, Bluetooth, infrared, radio-wave, and/or other analog and digital communication standards. Communication interface(s) allow for computing system 110 to be updated and information generated by computing system 110 to be shared to other devices. In some examples, communication interface(s) can send information stored in memory to another user device for display, storage or further analysis.

Figure 2:
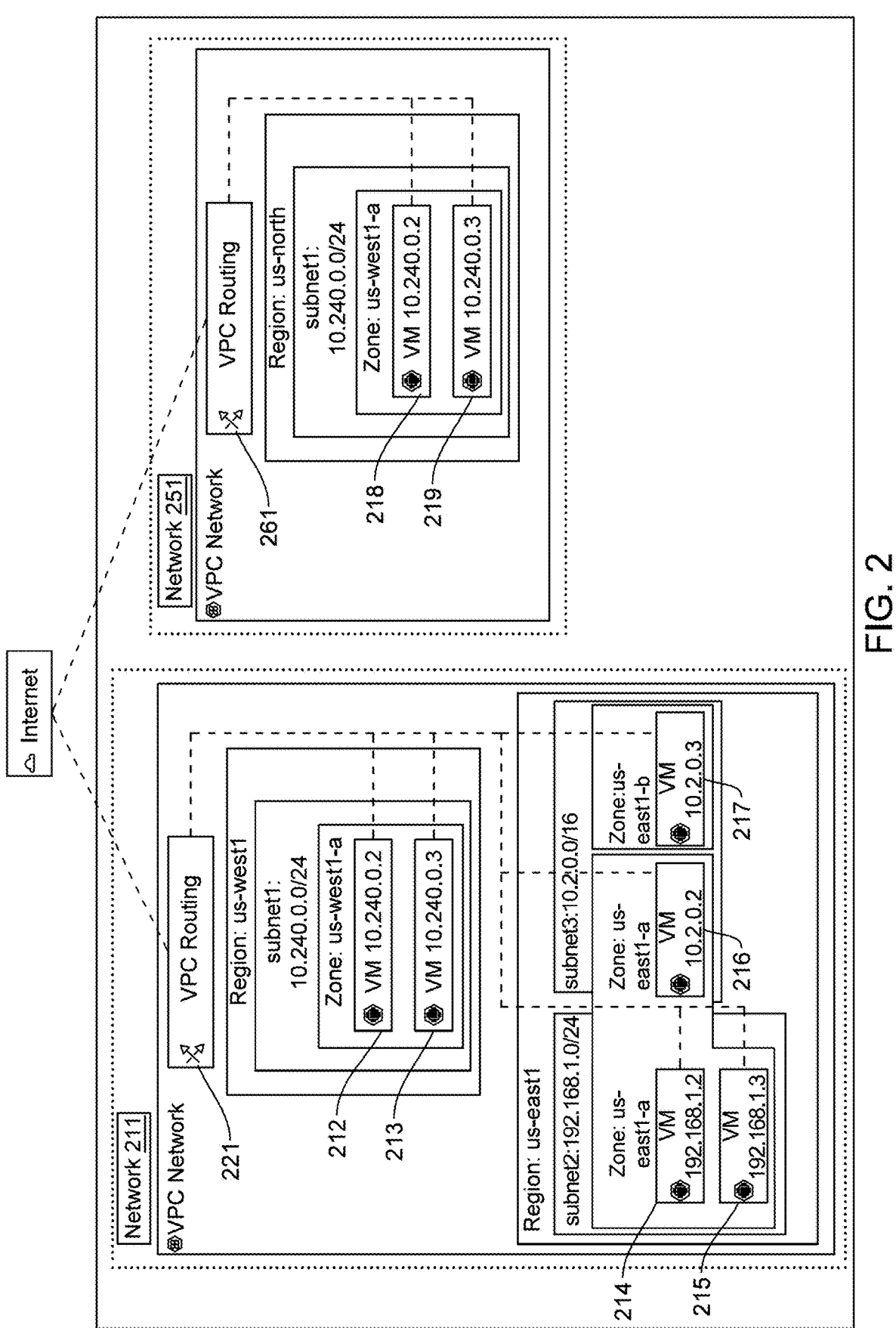
FIG. 2 illustrates example VPC networks according to aspects of the disclosure.

FIG. 2 illustrates example VPC networks. The VPC network(s) can be executed or run on a distributed computing platform, such as for example, Kubernetes, which can be running on a computing system, such as a computing system 110.

Illustrated in FIG. 2 are networks 211 and 251 existing on a cloud platform 201. The cloud platform 201 can be hosted on a combination of virtual or physical machines by a cloud provider. Each network can be run on a software-defined networking (SDN) stack, which can be a software layer within the "layers" on which the VPC network is run or established. SDN is an approach to network management that enables dynamic and programmatically efficient network configurations in order to improve network performance and monitoring, and thus enabling it to provide efficiencies in cloud computing environments.

Networks 211 and 251 can contain or be made of a VPC network, which are separated from one another. Networks 211 and 251, or VPC networks, can be hosted or run on a distributed computing system, such as for example, Kubernetes. In some examples, such as those illustrated in FIG. 2, the network can be a VPC network. Networks 211 and 251 contain VPC routing modules 221 and 261 respectively. VPC routing modules 221 and 261 can direct traffic external to one or more endpoints within networks 211 and 251, such as for example, virtual machines, virtualized containers, or virtualized computing nodes. VPC routing modules 221 and 261 can also connect various endpoints within each network. Each network can be broken down into smaller logical units or divisions, such as regions, subnets, or zones. In some examples, each logical node hosted within each VPC network can be one or more virtual machines, such as virtual machines (VMs) 212-219. Each virtual machine can be running as part of a distributed computing system.

As can be seen in FIG. 2, certain endpoints, such as VM 212 and 218, in different networks can contain the same IP address. Connecting VM 212 and 218 would create conflicts when routing data between the two VMs. As further explained below, networks 211 and 251 can be connected through the use of a service attachment.

Each network within cloud platform 201 can be logically isolated from every other network, allowing each user or owner of a network to control all elements within the network. In addition, as every network can be isolated, any services, virtual machines, or resources within a particular network may be inaccessible by another network without routing the data through the internet.

Figure 3A:
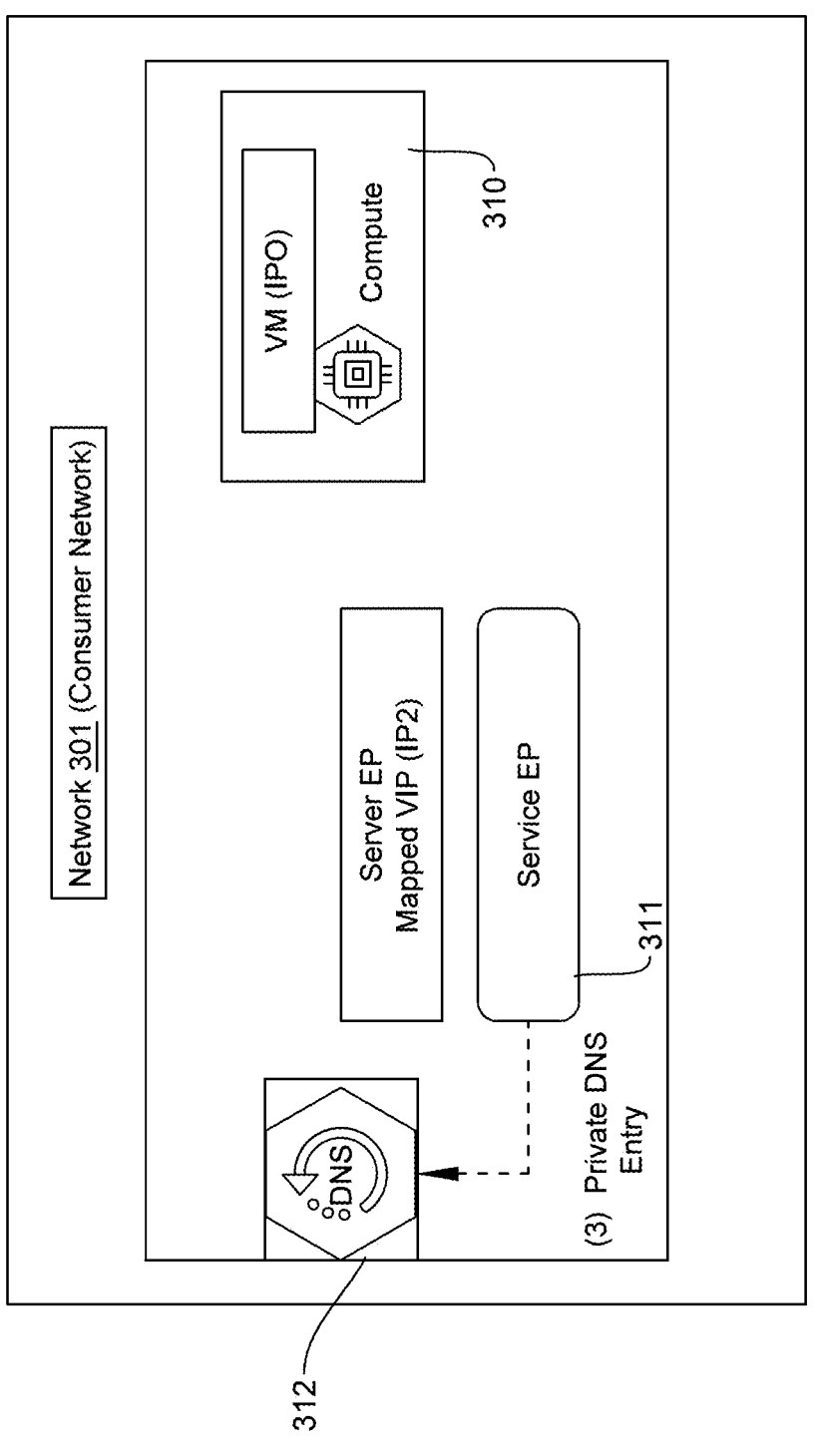
FIG. 3A illustrates an example "consumer" network according to aspects of the disclosure.

As explained further below, one or more components of networks within cloud platform 201 may contain a "physical" IP address or a virtual internet protocol (VIP) address. Further, various IP protocols can be used. For example, an Internet Protocol Version 6 (IPv6) or Internet Protocol Version 4 (IPv4) protocol can be used. An IPv6 address is a 128-bit alphanumeric value that identifies an endpoint device in an IPv6 network. IPv6 is the successor to a previous addressing infrastructure, IPv4. An IPv6 address is a numeric label that is used to identify and locate a network interface of a computer or a network node participating in a computer network using IPv6. IP addresses are included in the packet header to indicate the source and the destination of each packet. The IPv4 address is a 32-bit number that uniquely identifies a network interface on a system FIG. 3A illustrates a schematic view of a network 301, which can be similar to the networks described above. For simplicity, only a few components of network 301 are illustrated. Network 301, which can be a "consumer" network, can require access to one or more resources within network 302 (which are illustrated with respect to FIG. 3B), which can be deemed a "producer" network. As illustrated in FIG. 3A, and following figures, references to an IP address correspond to the respective module, endpoint, or device annotated.

Network 301 contains a number of compute nodes, such as virtual machine 310. In some examples, virtual machine 310 can be part of a container-orchestration system or distributed computing system. For example, virtual machine 310 can be a Kubernetes node, a kubelet, or other container, virtual machine 310 can contain virtualized or physical resources, including memory, processors, and storage. Virtual machine 310 can also have an IP address associated with it, which is labeled as "IPO".

Network 301 can further contain service endpoint 311. Service endpoint 311 can be a construct, module, or software which is instantiated, or otherwise run or established, within a network. It can specify connections to a service attachment, further explained below, and can contain information relevant to how the service is exposed inside network 301, such as for example, the virtual internet protocol (VIP) address of the load balanced service or other information. In some examples, service connect endpoint can be used interchangeably with service endpoint or service connect module. Service endpoints can also have a server endpoint EP VIP associated with it, such as IP2 in FIG. 3A. When the consumer chooses to create an "endpoint" to connect to the service over its chosen VIP (IP2), a DNS entry is automatically created for the consumer that resolves to that chosen VIP (IP2).

Network 301 can also contain a Domain Name System (DNS) module 312 which is coupled with service endpoint 311. DNS module 312 can contain an index of various domain names or other pointers and IP or other addresses associated with those domain names and pointers. The service endpoint can contain "private" entries within DNS module 312 which can be used to establish the private service connection.

The owner, user, administrator or controller of network 301 can create a service connection in order to connect to a service attachment which can be exposed within network 302.

Figure 3B:
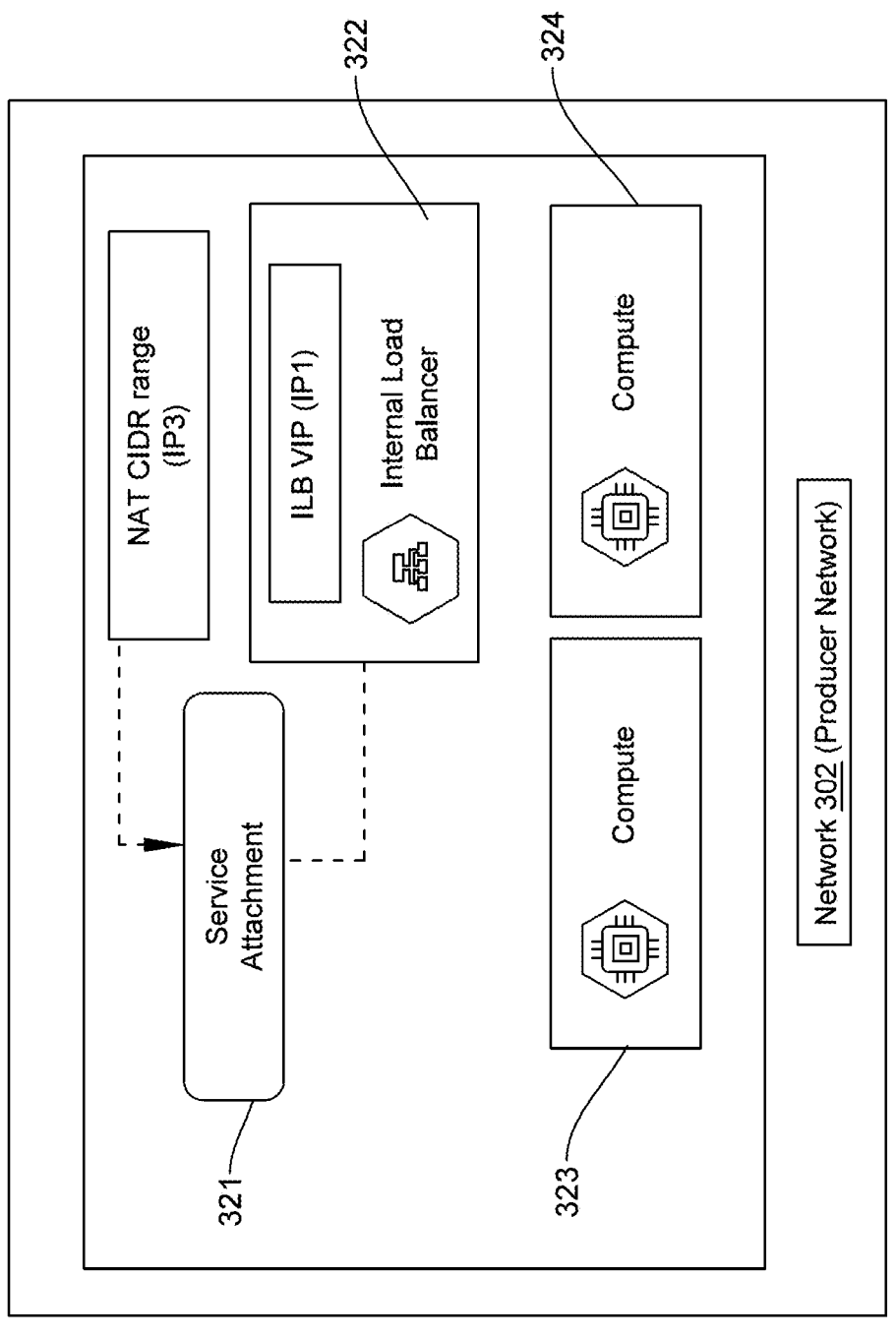
FIG. 3B illustrates an example "producer" network according to aspects of the disclosure.

FIG. 3B illustrates network 302, which can contain a service attachment 321, an internal load balancer (ILB) 322, and a number of compute nodes, such as compute nodes 323-324. In some examples, the compute nodes 323-324 can be referred to as a "service" which is intended to be accessed by network 301. In other examples, the internal load balancer, which can provide or control access to the compute nodes can be referred to as a "service" which is intended to be accessed by network 301. In some examples, the combination of the internal load balancer and associated compute nodes, e.g. compute nodes 323-324, can be referred to as the service. ILB 322 can be a load balancer to balance availability of resources within a network, computational power and capabilities, or balance incoming and outgoing connections and/or requests.

Service attachment 321 can be created within a producer network. Service attachment 321 can be a construct or module which can run within a VPC network and can contain information about a load balanced service. In some examples, such as in the case of layer 3 or 4 services within the 7 layered Open System Interconnection (OSI) layered model, a NAT range can be specified in order to be reserved for this service. A service within the producer network can create a service attachment in order to expose the service to the consumer network.

Figure 3C:
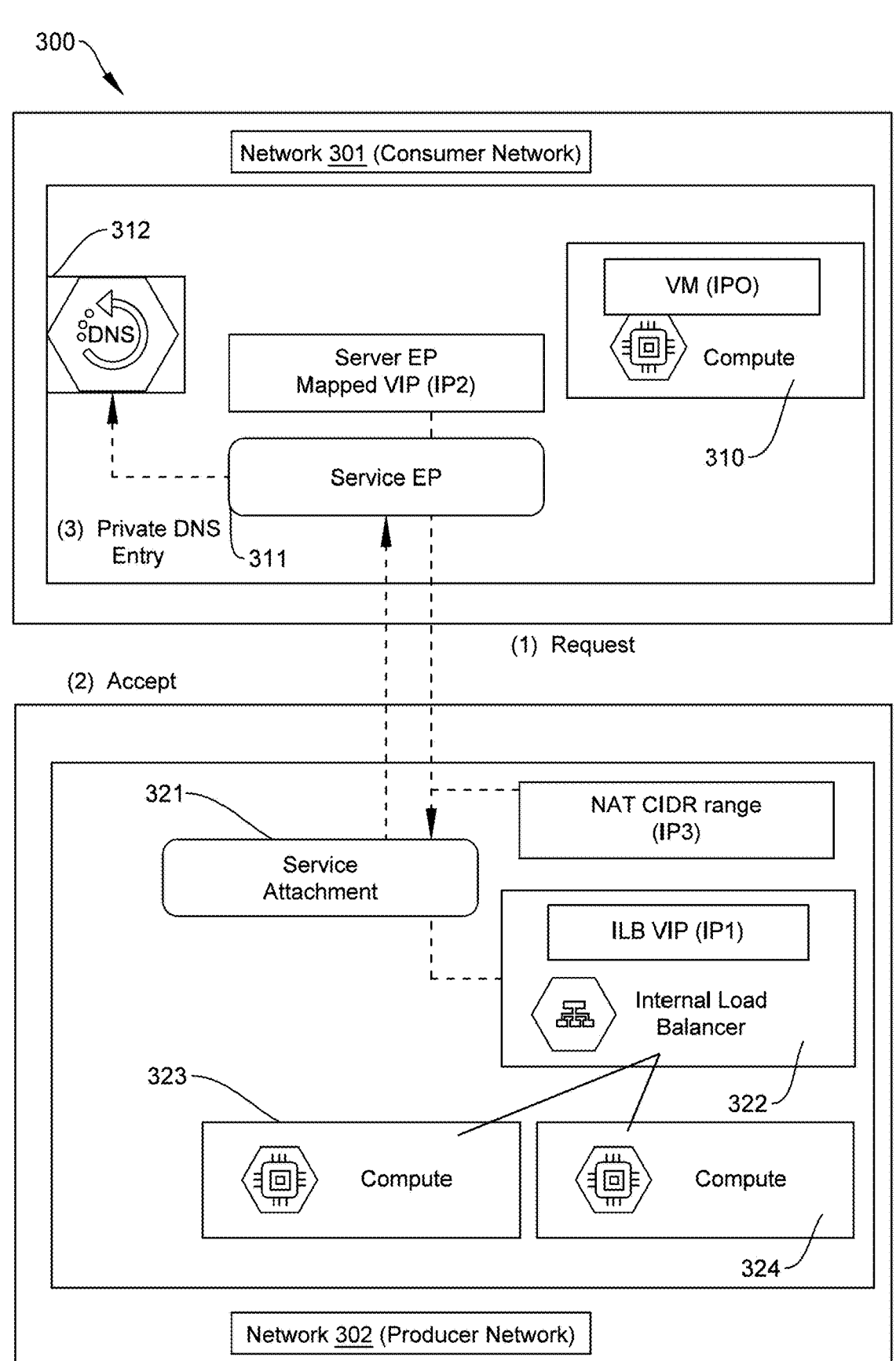
FIG. 3C illustrates an example schematic illustrating the establishment of a private proxyless connectivity connection or a private service connection between two VPC networks from a consumer network and a producer network.

FIG. 3C illustrates a schematic view of establishing a private service connection between endpoints of different networks according to aspects of the disclosed technology. In some examples, a node in a consumer network can be trying to connect to a load balancer in the producer network. In some examples, compute nodes can be endpoints.

Illustrated in FIG. 3C are networks 301 and 302, which can be similar to the networks described above. For simplicity, only a few components of networks 301 and 302 are illustrated. Network 301, which can be deemed a "consumer" network, can require access to one or more resources within network 302, which can be deemed a "producer" network.

As explained with respect to the architecture described in FIG. 3C, a private service connection can be established between network 301 and 302 which allows for services in one network to be accessed by another network while remaining within the cloud provider's domain. In one example, network 302 can create a service, as required, within its own network to be accessed by another network. The network can be created at varying layers within the OSI layer model. In some examples, a layer 4 internal load balancer (ILB) service or a layer 7 ILB service can be used or created. Network 302 can then create a service attachment 321. Service attachment 321 can point to the service created and can also provide a NAT Classless Inter-Domain Routing (CIDR). The NAT CIDR range can be allocated from network 302 and can be used by network 301 to communicate with the service established in network 302. Network 301 can create a service endpoint that connects to service attachment 321. The service attachment can have a service private vip addressed which can be allocated from available addresses or network of network 301. Endpoints in network 301, such as compute nodes, can use the address to "talk" to the service attachment. Service endpoint 311 can request the establishment of the private service connection, and service attachment 321 can accept this request to complete the establishment of the same. In some examples, a control plane process can be initiated or be used. The control plane processes can configure the connectivity on the data plane to allow connections to be established.

Upon establishment of the private service connect session, data flow is simple from the point of view of a user of network 301. An endpoint in the network 301 talks to the service private vip address in their network and it reaches the service attachment in network 302. The exact mechanism of how the packets make it to service and back depends on whether the service is level 7 (L7) ILB or level 4 (L4) ILB. Each of these are described in more detail below in FIGS. 4A-4C.

Figure 4A:
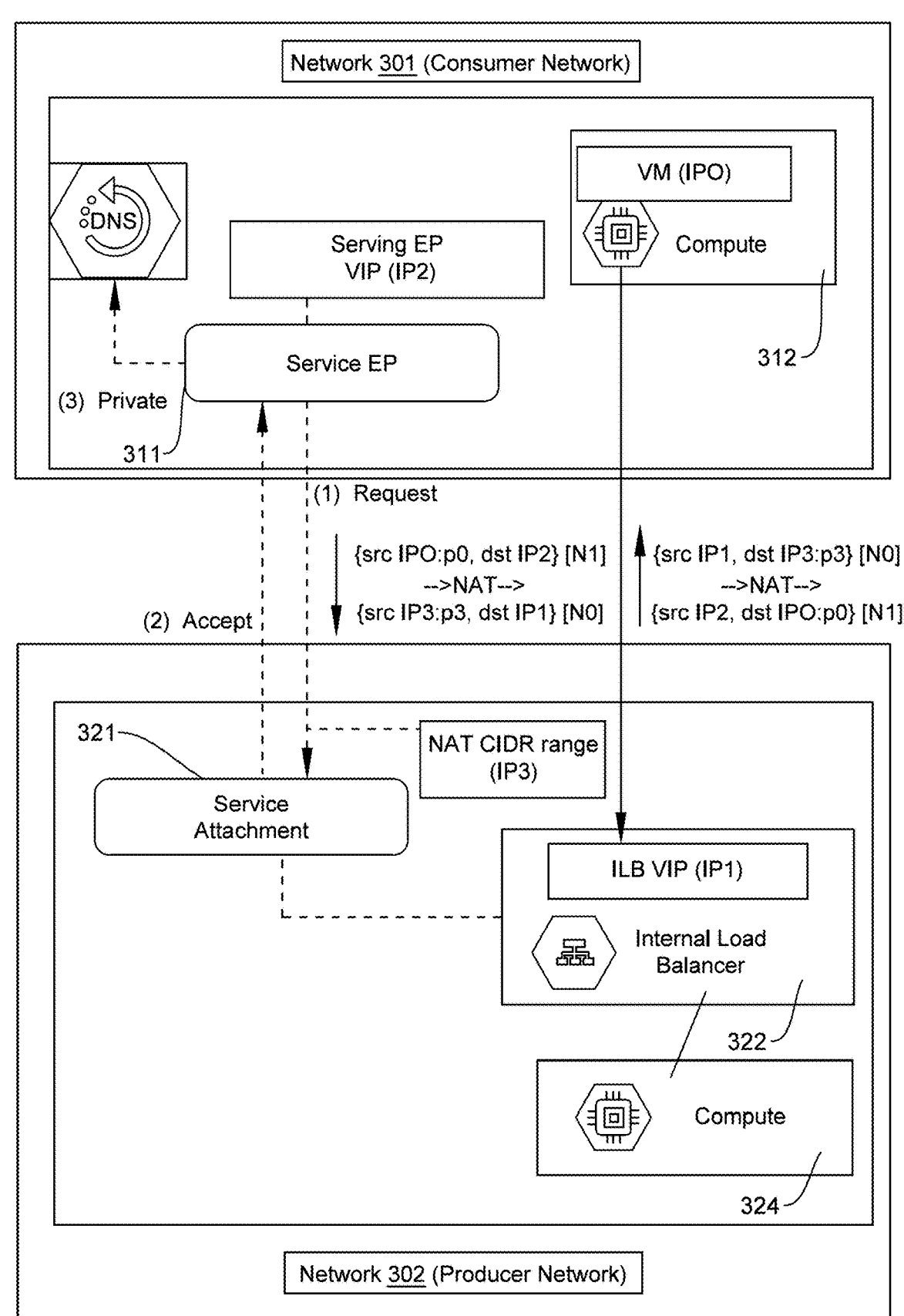
FIG. 4A illustrates data flow or data path once a private service connection is established in an L4 connection scheme.
Figure 4B:
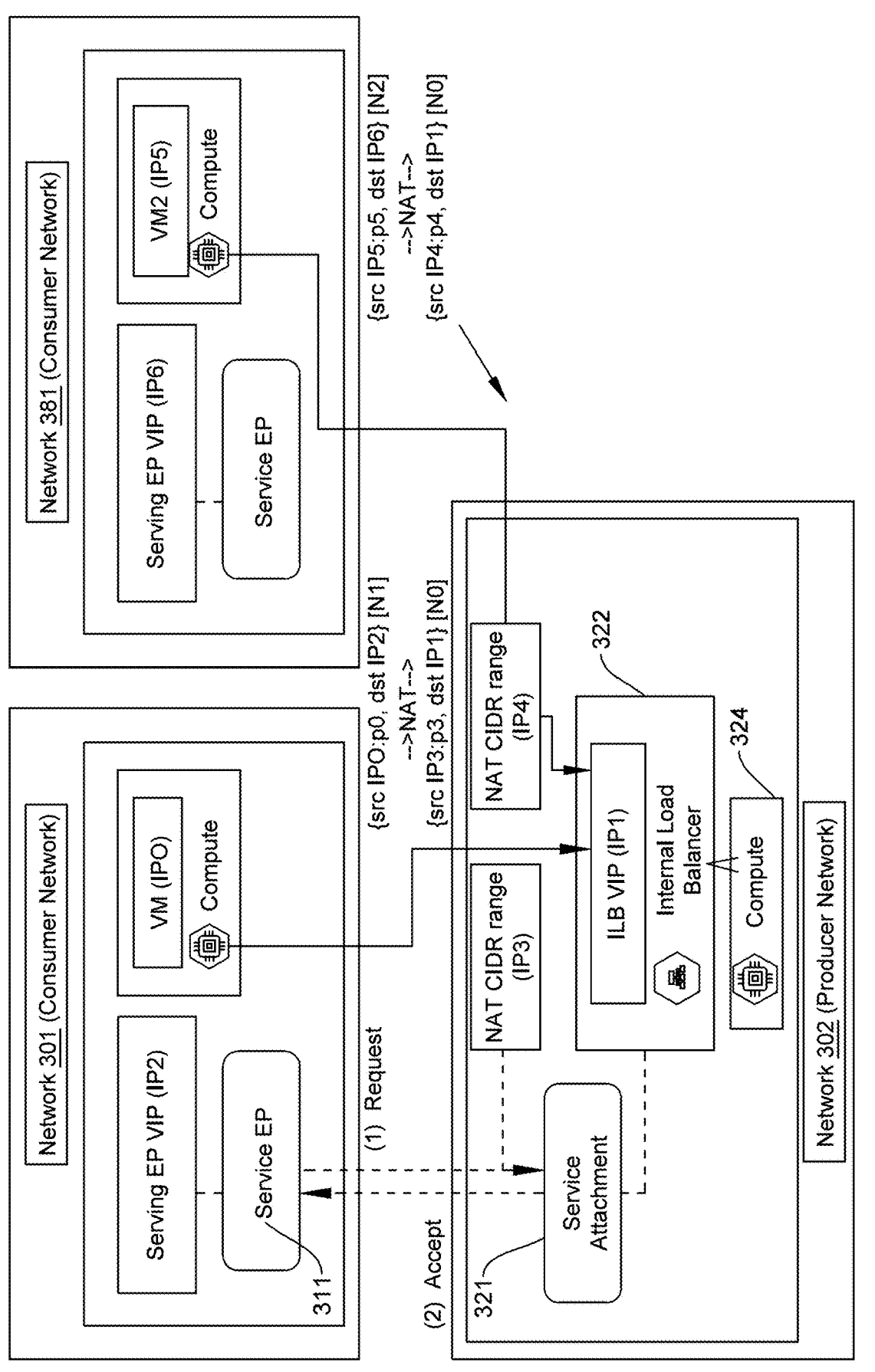
FIG. 4B illustrates data flow or data path once a private service connection is established in an L4 connection scheme between multiple networks.

FIGS. 4A and 4B illustrate data flow or a data path once a private service connection is established in an L4 ILB connection scheme. Components described with respect to FIGS. 4A and 4B retain the same reference numerals described with reference to the figures above. In some examples, as this can be done without the use of an IPv6 stack in this scheme, communication can be performed using IPv4 to backends in the network 302. This can be performed by using NAT from one VPC network to another, or stated alternatively, between network 301 and 302.

In the example provided in FIG. 4A, NAT CIDR range is used to NAT source address from the network 301 to network 302. To communicate to ILB 322, a VM running on virtual machine 310 can send a package with its source IP as "IPO" and its destination IP as "IP2." IP2 is the VIP of service EP 311 within network 301. This packet is within the scope of the network of network 301 and it is translate to the scope of the network 302 by NAT. When a response is to be sent, reverse translation can occur from the IPs of network 302 to the IPs or network 301.

In the example provided, NAT is performed at the SDN stack layer in relation to the VM1 host for both directions. NAT from network 301 to network 302 also translates source port from p0 to p3. The new source port (p3) is within the range of ports allocated to virtual machine 310 by the NAT. After the translation, the packet is routed as a regular packet within the network 301. In this example, the packet goes through ILB processing and reaches the backend.

FIG. 4B illustrates a similar scheme as that described with respect to FIG. 4B, but illustrates an additional consumer network 381 requesting a resource from network 302, and the simultaneous data connections between network 381 and network 302 as well as between network 301 and network 302.

Figure 5:
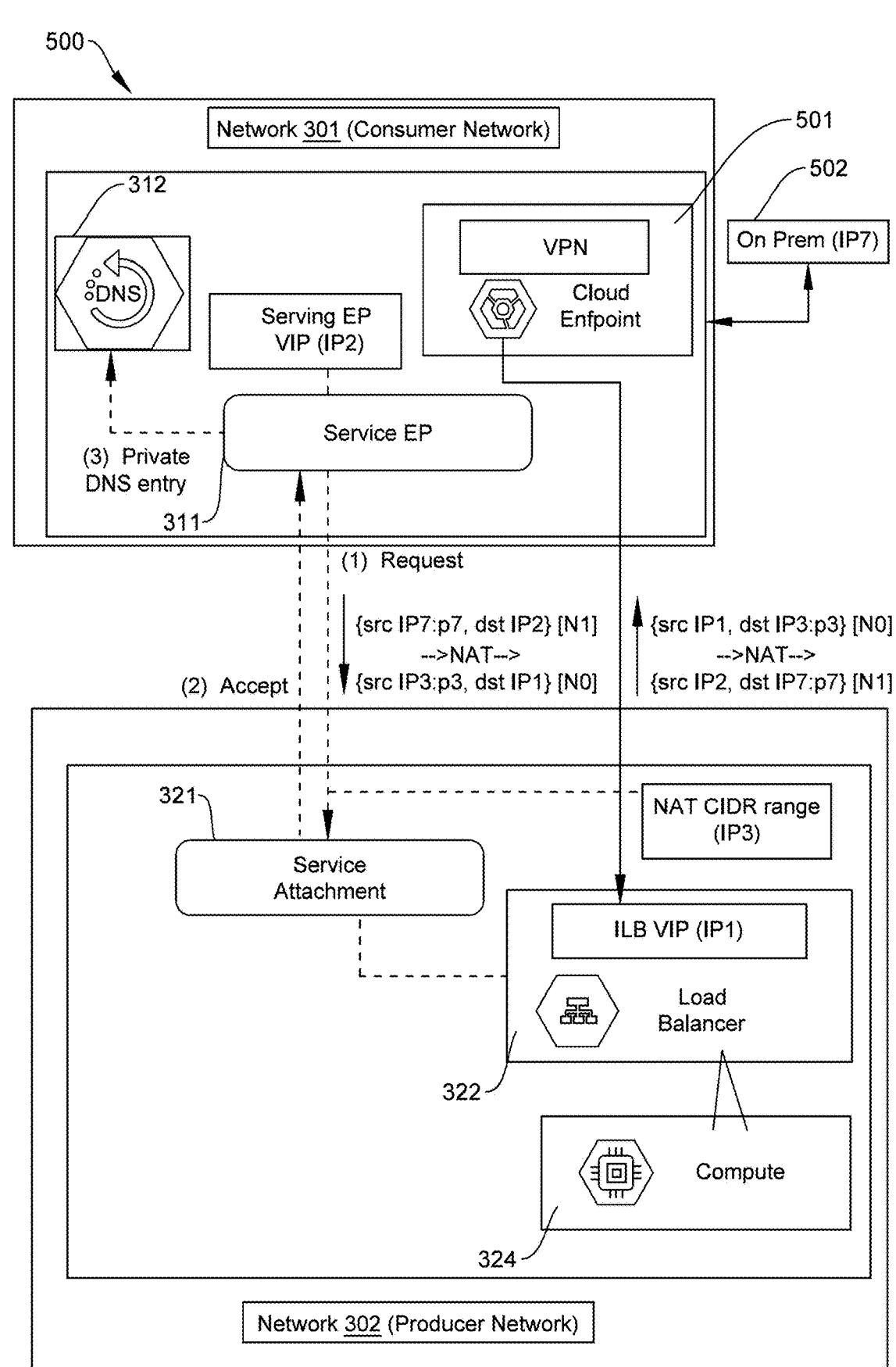
FIG. 5 illustrates an example architecture which depicts aspects of the disclosed technology with respect to other cloud platform features, such as VPN and firewalls.

FIG. 5 illustrates architecture 500 which describes aspects of the disclosed technology with respect to other cloud platform features, such as VPN and firewalls. FIG. 5 illustrates components described with respect to the aforementioned figures above in addition to VPN 501 and module 502, which may be "on premises."

With respect to firewalls, a remote service connected to a consumer's network should be accessible via VPN 501 in network 301. This will allow access to the connected services which are on premises with network 301 or on premises with the platform provider, such as module 502. VPN 501 can work with L7 ILB without any modification. Since there is no NAT involved, an SDN layer in VPN endpoint in the platform provider can encapsulate the physical host running L7 ILB, similar to the process described above for a packet originating from a virtual machine.

In the case of a remote L4 ILB, a physical host running any endpoint of network 301 should translate the IP addresses to network 302. This can be done in the SDN layer and can be similar to what the SDN layer does for packets originating from a VM. Each VPN endpoint may require its own NAT IP, which can be outside of network 302, in order to handle translation of a large number of connections.

With respect to firewalls, for an L7 ILB scheme, a packet is always in the scope of network 301, and the network firewall rules of network 301 can be applied. Security policies running the L7 ILB will perform the admission control on incoming connections in network 302.

Further, with respect to firewalls, for an L4 ILB scheme, rules can be applied both before and after translation. As packets are translating from network 301 to network 302, and vice versa, it is important that firewall policies of both networks to the respective networks be applied.

Figure 6:
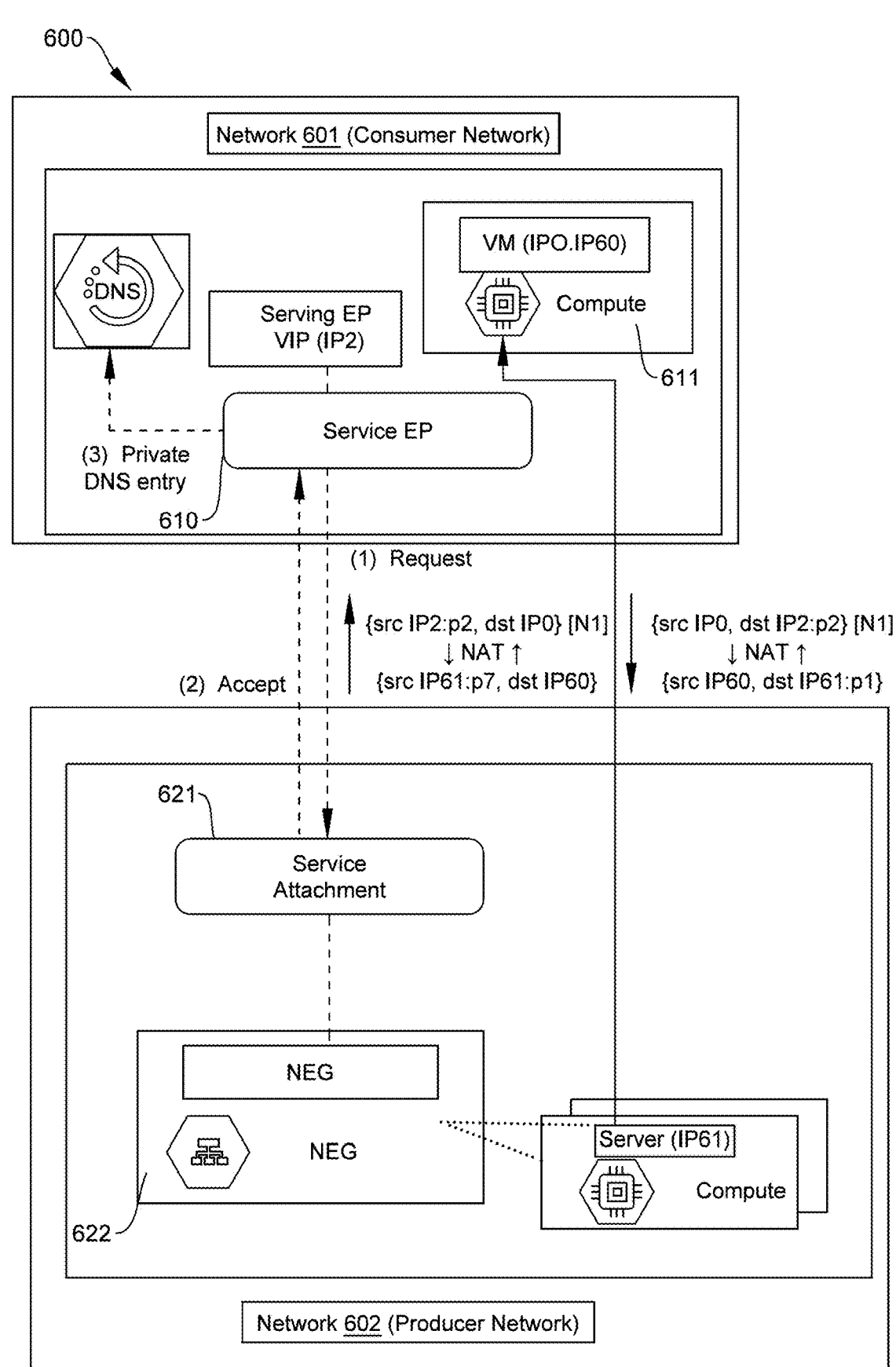
FIG. 6 illustrates an example of a "reverse connection" through the use of a service to initiate a private connection to remote endpoints.

FIG. 6 illustrates an example of a "reverse connection" through the use of a service to connect to remote endpoints. In contrast to a connection where an arbitrary endpoint, such as a VM or pod, needs to connect to a service in another network, a "reverse connection" can be the case where the service initiates the connection to arbitrary endpoints in the "consumer" network.

Illustrated in FIG. 6 is "consumer" network 601 and "producer" network 602. Similar to network 301, network 601 can contain a service EP 610, and a VM 611. Network 602 can contain a service attachment 621, a network endpoint group (NEG) 622, and a server 623. A network endpoint group (NEG) is a configuration object that specifies a group of backend endpoints or services. VM 611 and server 623 can contain an IPv6 address, as illustrated in FIG. 6. IP60 and IP61 are IPv6 addresses illustrated in FIG. 6. NAT can be performed on the SDN layer while the NAT64 processing on the physical machine For scenarios where endpoints may not support IPv6, the SDN layer can translate IPv6 to IPv4 before it reaches the destination. IPv6 addresses can be assigned to each network interface even when the addresses are not IPv6 enabled. In some examples, such addresses are only used by IPv6 endpoints to initiate connections to remote IPv4 only endpoints, such as, for example, between NEG 622 and service EP 610. When the IPv6 enabled endpoint uses an Application Programming Interface (API) to list remote endpoints, it also receives corresponding IPv6 addresses. It uses the received addresses to initiate a connection to that endpoint in network 601. On the physical machine running the SDN layer will use NAT from IPv6 to IPv4 to translate the packet to the IPv4 address of the remote endpoint. The source IPv4 address is picked from the remote network. This is picked during the Private Service Connect establishment. Source IPv4 address given a range of ports will identify the physical host initiating the connection.

In the response, the IPv4 packet is routed to the destination host based on the destination IPv4 address and the port. The IPv4 packet from the remote endpoint is NAT from IPv4 to IPv6 at the destination host.

Through the above translation process, a connection of packets can be established between VM 611 and server 623 after initiation of the process by network 602.

In some examples, reverse connections can be achieved using IPv6 addresses for all endpoints within a network, where the step of translation from IPv4 to IPv6 and vice versa may be omitted.

Taken together, these features serve to eliminate the need to manage peered networks (consumer and producer networks can have overlapping IP ranges), avoid relying on public IP addresses for connections from consumers to services, and provide line-rate latency and throughput for traffic between consumer and service endpoints.

While this disclosure contains many specific implementation details, these should not be construed as limitations on the scope of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

The invention claimed is:

1. A method of communicating between networks on a cloud service, the method comprising:

determining a service to be consumed by a consumer network on the cloud service, the service stored on a logically isolated producer network on the cloud service, the consumer network comprising a consumer address space including a plurality of existing consumer addresses, the producer network comprising a producer address space including a plurality of existing producer addresses, wherein the consumer address space and the producer address space include overlapping addresses;

creating, by the producer network, a logical service attachment related to the service to expose the service the consumer network and point to the service from the consumer network thereby providing an entry point for service endpoints of the consumer network to access the service stored on the producer network without using a public Internet Protocol (IP) address and without exposing the service to other networks on the cloud service, the logical service attachment providing an address translation range allocated from the producer address space and reserved for the service for use by the consumer network to establish a private connection with the producer address space, wherein the address translation range is used by the consumer network to perform network address translation to communicate with the service;

creating, on the consumer network, a logical service endpoint to connect to the logical service attachment, the logical service endpoint including a service private virtual IP (VIP) address allocated from the consumer address space to the logical service attachment and used by endpoints in the consumer network to communicate with the logical service attachment;

requesting, by the logical service endpoint in the consumer network, to establish the private connection to the producer network using the service private VIP address allocated from the consumer network, the service private VIP address being within the address translation range provided by the logical service attachment when the service was exposed to the consumer network;

accepting, by the logical service attachment in the producer network, the request to establish the private connection;

establishing the private connection between the logical service endpoint and the logical service attachment; and sending data from the endpoints in the consumer network to the service through the logical service attachment via the private connection using the service private VIP address.

2. The method of claim 1 wherein a level 7 internal load balancer or level 7 OSI model is used to communicate between the networks of the cloud service.

3. The method of claim 1 wherein a level 4 internal load balancer or level 4 OSI model protocol is used to communicate between the networks of the cloud service.

4. The method of claim 1 wherein the consumer network and the producer network are running on a distributed computing platform.

5. The method of claim 4 wherein a service to be accessed in the producer network is a container.

6. The method of claim 1, wherein one or more of the plurality of existing consumer addresses are the same as one or more of the plurality of existing producer addresses.

7. The method of claim 1 wherein the service to be accessed in the producer network is an internal load balancer.

8. The method of claim 1 wherein the service to be accessed in the producer network is a network endpoint group.

9. The method of claim 1, further comprising:

sending, by a virtual machine in the consumer network, a package identifying the logical service endpoint as its destination address; and translating, by software defined networking stack layer, the destination address of the package to a virtual internet protocol address of an internal load balancer in the producer network.

10. A system comprising:

one or more processing devices coupled to a memory containing instructions, the instructions causing the one or more processing devices to:

determine a service to be consumed by a consumer network on a cloud service, the service stored on a logically isolated producer network on the cloud service, the consumer network comprising a consumer address space including a plurality of existing consumer addresses, the producer network comprising a producer address space including a plurality of existing producer addresses, wherein the consumer address space and the producer address space include overlapping addresses;

create, by the producer network, a logical service attachment related to the service to expose the service the consumer network and point to the service from the consumer network thereby providing an entry point for service endpoints of the consumer network to access the service stored on the producer network without using a public Internet Protocol (IP) address and without exposing the service to other networks on the cloud service, the logical service attachment providing an address translation range allocated from the producer address space and reserved for the service for use by the consumer network to establish a private connection with the producer address space, wherein the address translation range is used by the consumer network to perform network address translation to communicate with the service;

create, on the consumer network, a logical service endpoint to connect to the logical service attachment, the logical service endpoint including a service private virtual IP (VIP) address allocated from the consumer address space to the logical service attachment and used by endpoints in the consumer network to communicate with the logical service attachment;

request, by the logical service endpoint in the consumer network, to establish the private connection to the producer network using the service private VIP address allocated from the consumer network, the service private VIP address being within the address translation range provided by the logical service attachment when the service was exposed to the consumer network;

accept, by the logical service attachment in the producer network, the request to establish the private connection;

establish the private connection between the logical service endpoint and the logical service attachment; and send data from the endpoints in the consumer network to the service through the logical service attachment via the private connection using the service private VIP address.

11. The system of claim 10 wherein the consumer network and producer network are running on a distributed computing platform.

12. The system of claim 11 wherein a service to be accessed in the producer network is a container.

13. The system of claim 10, wherein the one or more processing devices are configured to:

send, by a virtual machine in the consumer network, a package identifying the logical service endpoint as its destination address; and translate, by software defined networking stack layer, the destination address of the package to a virtual internet protocol address of an internal load balancer in the producer network.

14. A non-transitory computer readable medium containing instructions, the instructions when executed configured to perform the steps of:

determining a service to be consumed by a consumer network on a cloud service, the service stored on a logically isolated producer network on the cloud service, the consumer network comprising a consumer address space including a plurality of existing consumer addresses, the producer network comprising a producer address space including a plurality of existing producer addresses, wherein the consumer address space and the producer address space include overlapping addresses;

creating, by the producer network, a logical service attachment related to the service to expose the service the consumer network and point to the service from the consumer network thereby providing an entry point for service endpoints of the consumer network to access the service stored on the producer network without using a public Internet Protocol (IP) address and without exposing the service to other networks on the cloud service, the logical service attachment providing an address translation range allocated from the producer address space and reserved for the service for use by the consumer network to establish a private connection with the producer address space, wherein the address translation range is used by the consumer network to perform network address translation to communicate with the service;

creating, on the consumer network, a logical service endpoint to connect to the logical service attachment, the logical service endpoint including a service private virtual IP (VIP) address allocated from the consumer address space to the logical service attachment and used by endpoints in the consumer network to communicate with the logical service attachment;

requesting, by the logical service endpoint in the consumer network, to establish the private connection to the producer network using the service private VIP address allocated from the consumer network, the service private VIP address being within the address translation range provided by the logical service attachment when the service was exposed to the consumer network;

accepting, by the logical service attachment in the producer network, the request to establish the private connection;

establishing the private connection between the logical service endpoint and the logical service attachment; and sending data from the endpoints in the consumer network to the service through the logical service attachment via the private connection using the service private VIP address.

15. The non-transitory computer readable medium of claim 14, wherein the instructions when executed are further configured to perform the steps of:

sending, by a virtual machine in the consumer network, a package identifying the logical service endpoint as its destination address; and translating, by software defined networking stack layer, the destination address of the package to a virtual internet protocol address of an internal load balancer in the producer network.

* * * * *